United States Patent
Stolt et al.

(10) Patent No.: US 6,557,071 B2
(45) Date of Patent: Apr. 29, 2003

(54) MEMORY SYSTEM INCLUDING A MEMORY CONTROLLER HAVING A DATA STROBE GENERATOR AND METHOD FOR ACCESING A MEMORY USING A DATA STORAGE

(75) Inventors: Patrick F. Stolt, Beaverton, OR (US); Stephen S. Pawlowski, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/102,096

(22) Filed: Jun. 22, 1998

(65) Prior Publication Data

US 2001/0011322 A1 Aug. 2, 2001

(51) Int. Cl.⁷ .................... G06F 13/00; G11C 11/4093
(52) U.S. Cl. ..................... 711/105; 711/5; 711/157; 365/189.05; 365/193; 365/230.03
(58) Field of Search ..................... 711/5, 157, 167, 711/105; 713/50 D, 503; 365/230.03, 230.04, 233, 193, 189.05

(56) References Cited

U.S. PATENT DOCUMENTS

| | | | | |
|---|---|---|---|---|
| 5,550,533 A | * | 8/1996 | Pawlowski | 340/825.2 |
| 5,577,236 A | * | 11/1996 | Johnson et al. | 711/5 |
| 5,640,527 A | * | 6/1997 | Pecone et al. | 711/5 |
| 5,652,856 A | * | 7/1997 | Santeler | 711/105 |
| 5,860,128 A | * | 1/1999 | Murdoch et al. | 711/167 |
| 5,896,347 A | * | 4/1999 | Tomita et al. | 365/233 |
| 5,926,838 A | * | 7/1999 | Jeddeloh | 711/167 |
| 5,940,328 A | * | 8/1999 | Iwamoto et al. | 365/189.01 |
| 5,950,223 A | * | 9/1999 | Chiang et al. | 711/105 |
| 5,986,948 A | * | 11/1999 | Cloud | 365/193 |
| 5,987,576 A | * | 11/1999 | Johnson et al. | 711/167 |
| 6,003,118 A | * | 12/1999 | Chen | 711/167 |
| 6,009,489 A | * | 12/1999 | Mergard | 711/167 |
| 6,112,284 A | * | 8/2000 | Hayek et al. | 711/167 |

FOREIGN PATENT DOCUMENTS

WO   9621226   *   7/1996

* cited by examiner

*Primary Examiner*—Glenn Gossage
(74) *Attorney, Agent, or Firm*—Kenyon & Kenyon

(57) ABSTRACT

A memory subsystem for a computer system includes a memory controller that has a data strobe generator. The memory subsystem further includes a Dynamic Random Access Memory ("DRAM") array coupled to the memory controller and a data path coupled to the data strobe generator and the DRAM array. The DRAM array is separated into two DRAM sets coupled to a common output bus. Access to the DRAM array begins with access to the first DRAM set. After a first Column Address Strobe (CAS) is applied to the first DRAM set, a data strobe is asserted which causes data from the first DRAM set to be latched into the data path. On the next clock cycle after the data strobe is asserted, the data strobe and first CAS are de-asserted. A second CAS is then applied to the second DRAM set on the next clock cycle after the first CAS is de-asserted. In one embodiment, the data path includes a latch that has inputs coupled to the data strobe and an output of the DRAM array via the common output bus. In a further embodiment, the data path includes a flip-flop that has an input coupled to the latch output, and a clock input coupled to the clock.

26 Claims, 5 Drawing Sheets

MEMORY SYSTEM INCLUDING A MEMORY CONTROLLER HAVING A DATA STROBE GENERATOR AND METHOD FOR ACCESING A MEMORY USING A DATA STORAGE

FIELD OF THE INVENTION

The present invention is directed to accessing a memory array in a computer system. More particularly, the present invention is directed to accessing a memory array in a computer system using a data strobe.

BACKGROUND OF THE INVENTION

Computer systems require a large amount of memory in order to store programs and data. One type of memory common to virtually all computer systems is dynamic random access memory ("DRAM").

When accessing DRAM, a row address strobe ("RAS") must first be asserted, and then a column address strobe ("CAS") is asserted. Since DRAM is asynchronous, data cannot be read from or written into DRAM until some delay time after the CAS asserted, in order to allow the DRAM sufficient time to react to the CAS. This delay time reduces the access speed of the DRAM.

Another delay that reduces the access speed of DRAM is the time for the RAS and CAS signals to physically reach the DRAM after they are generated. In a typical desktop personal computer, the total DRAM might occupy 1–2 dual in-line memory module ("DIMM") slots, and the signal delay is minimal. However, in large multiprocessor computer servers, the amount of required DRAM can sometimes occupy 32 or more DIMM slots. Because of the large number of memory boards in these systems, the longest trace lengths between the device generating the RAS and CAS signals and the DRAMs must be increased to reach all of the DRAMs. The increased trace length, because of added capacitance, further increases the time for the RAS and CAS signals to reach the DRAMs, therefore further reducing the access speed of the DRAMs.

Based on the foregoing, there is a need for a method and apparatus to increase the access speed of DRAM, regardless of the amount of DRAM in a computer system.

SUMMARY OF THE INVENTION

One embodiment of the present invention is a memory subsystem for a computer system. The memory subsystem includes a memory controller that has a data strobe generator. The memory subsystem further includes a DRAM array coupled to the memory controller and a data path coupled to the data strobe generator and the DRAM array.

DETAILED DESCRIPTION

Figure 1:
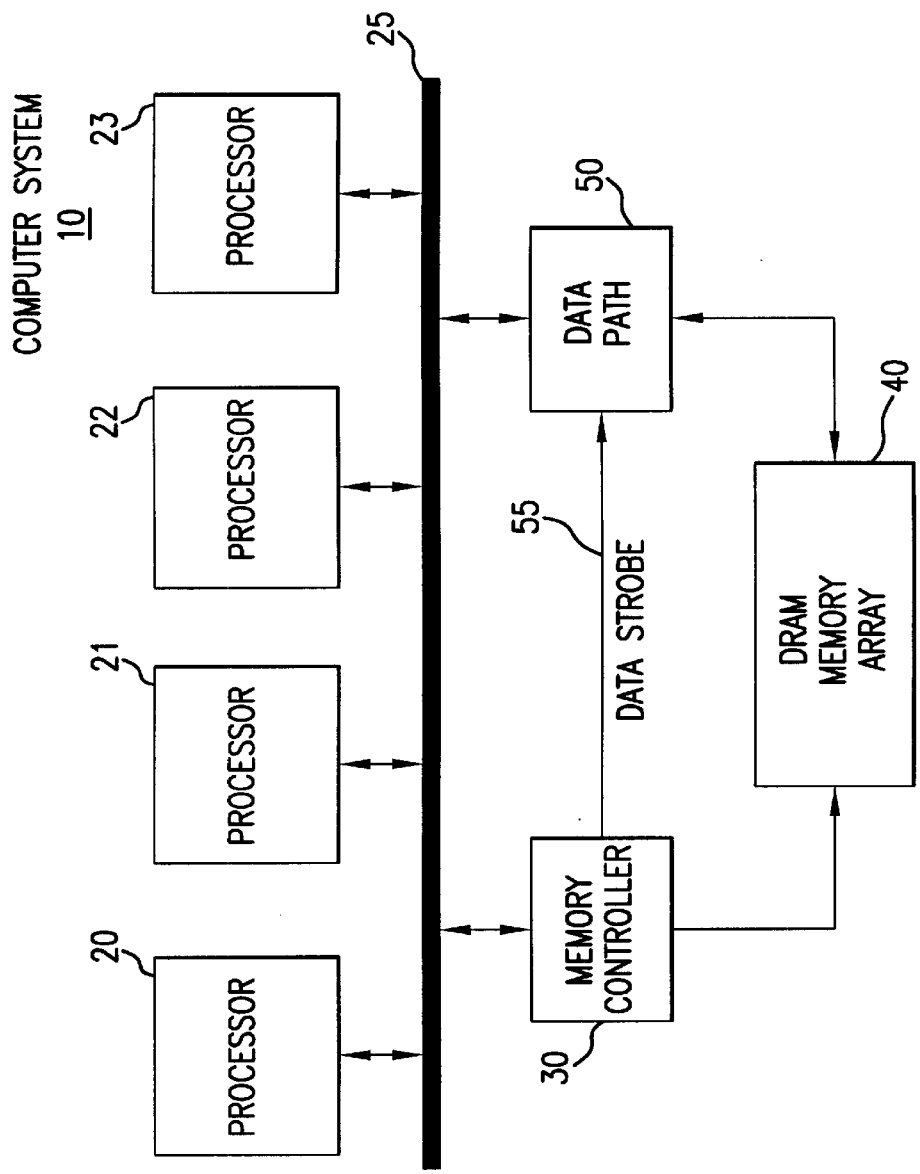
FIG. 1 is a block diagram of a computer system in accordance with one embodiment of the present invention.

One embodiment of the present invention is a data strobe between a memory controller and a data path to increase access speed to DRAM. Referring now in detail to the drawings, wherein like parts are designated by like reference numerals throughout, FIG. 1 is a block diagram of a computer system in accordance with one embodiment of the present invention.

Computer system 10 includes processors 20–23. In one embodiment, processors 20–23 are Pentium® II processors from Intel Corporation. Processors 20–23 are coupled to a memory subsystem through a bus 25. The memory subsystem includes a memory controller 30, a DRAM memory array 40, and a data path 50.

DRAM memory array 40 comprises a plurality of DRAMs. In one embodiment, the DRAM is packaged in DIMMs or single in-line memory modules ("SIMMs"). Further, in one embodiment, the DRAM in DRAM memory array 40 is Extended Data Output ("EDO") DRAM. In other embodiments, the DRAM in DRAM memory array 40 is fast page mode DRAM, synchronous DRAM (SDRAM), or any other type of DRAM.

Memory controller 30 is responsible for servicing requests for access to DRAM memory array 40 from other devices in computer system 10. Memory controller 30 includes state machines that output the required control signals used to access the DRAM in DRAM memory array 40. The control signals include RAS and CAS signals. Memory controller 30 further outputs a data strobe signal 55 to data path 50 that reduces overall access time for multiple accesses to DRAM memory array 40. In one embodiment, all outputs of memory controller 30 are generated by flip-flops that are clocked by the same clock signal and therefore are synchronous.

Data path 50 captures data from DRAM memory array 40 during a read operation (and vice versa during a write operation) and sends the data to the requesting device in computer system 10 over bus 25. In one embodiment, data path 50 comprises a plurality of multiplexers.

Figure 2:
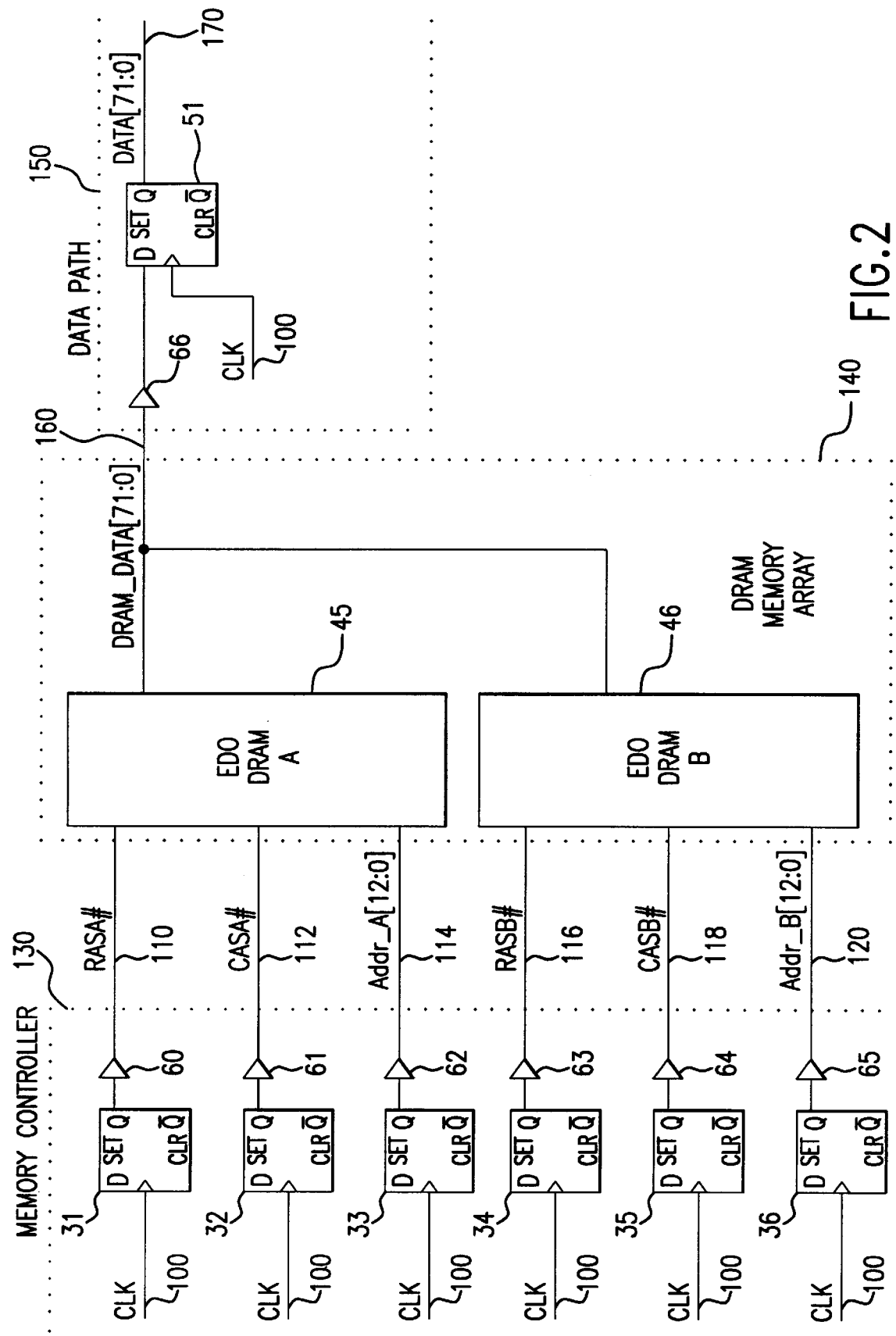
FIG. 2 is a block diagram illustrating in detail a memory controller that does not have a data strobe generator, a DRAM memory array and a data path of a memory subsystem of the computer system of FIG. 1.

FIG. 2 is a block diagram illustrating in detail a memory controller 130, a DRAM memory array 140 and a data path 150 of a memory subsystem. Memory controller 130 and data path 150 are similar to memory controller 30 and data path 50 of FIG. 1 except that they do not include data strobe 55.

Memory controller 130 includes a plurality of flip-flops 31–36 coupled to a plurality of buffers 60–65. Each flip-flop 31–36 is coupled to a common clock signal, CLK 100. The D-input of each flip-flop 31–36 is coupled to additional circuitry within memory controller 130 (not shown).

DRAM memory array 140 includes two EDO DRAM, EDO DRAM A (DRAM 45) and EDO DRAM B (DRAM 46). DRAMs 45 and 46 each include a set of the plurality of DRAM DIMMs that comprise DRAM memory array 140. Flip-flops 31 and 32 generate and output a RAS signal, active low (RASA# 110), and a CAS signal, active low (CASA# 112), respectively, to DRAM 45. Flip-flop 33 (and other similar flip-flops, not shown, for each line) generate and output an address signal (Addr_A 114) that specifies the location to be accessed in DRAM 45. Flip-flops 34 and 35 output a RAS signal, active low (RASB# 116), and a CAS signal, active low (CASB# 118), respectively, to DRAM 46. Flip-flop 36 (and other similar flip-flops, not shown, for each line) output an address signal (Addr_B 120) that specifies the location to be accessed in DRAM 46.

DRAM memory array 140 outputs DRAM_Data bus 160. DRAM_Data bus 160 is a common data bus from DRAM memory array 140 to data path 150. Both sets of DRAMs, DRAM 45 and DRAM 46, have one connection to each signal on DRAM_Data bus 160. This is done to reduce the number of pins required at data path 150. Connecting the data lines together limits how the two sets of DRAMs can be accessed so that accessing one does not interfere with accessing the other one. In one embodiment, DRAM_Data bus 160 includes 72 data lines.

Data path 150 includes a flip-flop 51 for each line of DRAM_Data bus 160 which is coupled to DRAM_Data bus 160 through a buffer 66 and coupled to CLK 100. The output of flip-flop 51, on Data bus 170, is the final captured data set that will be transmitted to the requesting device, usually one of the processors 20–23 in computer system 10 as shown in FIG. 1.

Figure 3:
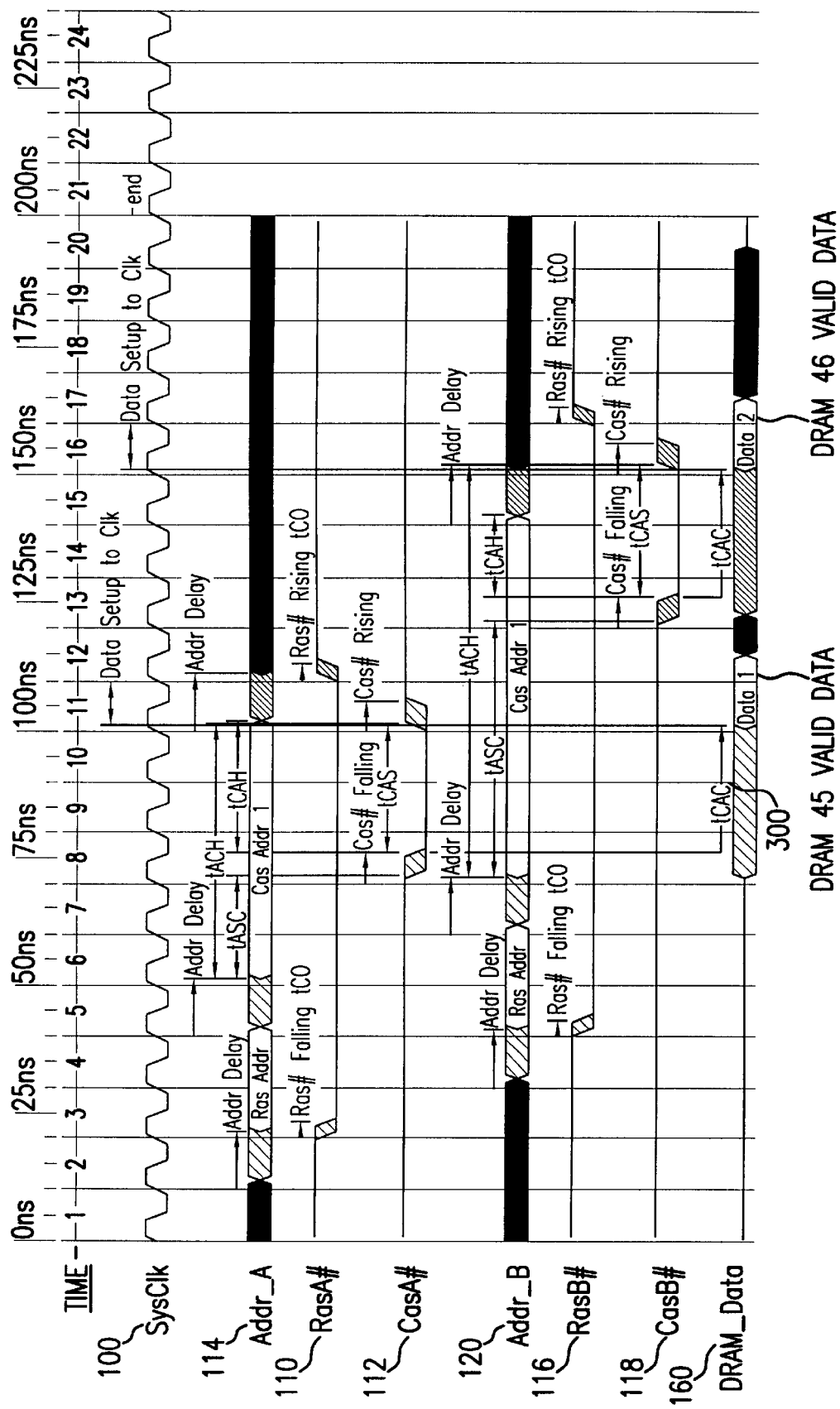
FIG. 3 is a timing diagram of DRAM access to the DRAM memory array of the memory subsystem of FIG. 2.

FIG. 3 is a timing diagram of DRAM access to DRAM memory array 140 of FIG. 2. Access starts with a row address being applied to Addr_A 114 and RASA# 110 being asserted (active low) during time period 3 (time=3). RASA# 110 must be asserted during the entire memory access. Next, Addr_A 114 changes to the column address during time=6 and CASA# 112 is asserted during time=8. Some time after CASA# 112 is asserted (i.e., during time=8), DRAM_Data bus 160 will transition to an active state from the no driver or high-impedance state. This time is defined as tON and is specified by the DRAM manufacturer. After an additional time, tCAC 300, DRAM 45 is guaranteed to be driving valid data (during time=11). The data cannot be captured at data path 150, however, until an additional "flight time" delay has elapsed. The flight time is the time it takes the DRAMs to charge the wires or Printed Circuit Board (PCB) traces in the system to their proper, valid levels and for the electrical wave-front to reach the pins of data path 150. After the data is captured in data path 150, RASA# 110 can be de-asserted (during time=12).

In high performance computer systems, memory access times and bandwidth are critical to overall system performance and sometimes extreme measures are taken to provide that performance. One common technique is to access more than one set of memory at a time to reduce the apparent access latency. In other words, if one location in memory can be accessed, and while that access is taking place, another can start being accessed, the second access latency penalty can be hidden. That is one reason why there are two sets of DRAM memories, DRAM 45 and 46, in DRAM memory array 140. While the access to DRAM 45 has been started by a set of sequences on the control signals of DRAM 45, a similar set of sequences on the control signals of DRAM 46 takes place to start access to DRAM 46. That is also why there are two sets of signals input to DRAM memory array 140. With two sets, each access can be started individually.

The timing diagram of FIG. 3 illustrates that the set of signals for DRAM 46 begins during time=4 and time=5. The RAS portion (RASB# 116) of the access can proceed but memory controller 130 must wait before asserting the CAS signal (CASB# 118) as this would cause DRAM 46 to start outputting data on DRAM_Data bus 160 which would conflict with and corrupt the data from the first access. CASB# 118 is asserted during time=13 and the data is captured from DRAM 46 during time=16 and 17.

The minimum DRAM to DRAM access time in the timing diagram of FIG. 3 is measured from the first data from DRAM 45 being captured to the second data from DRAM 46 being captured. Two things must happen between the two accesses: the first DRAM (DRAM 45) must stop driving the common data bus, DRAM_Data bus 160 (which translates to memory controller 130 waiting a fixed number of clocks until starting the next access) and then the CAS# access time for the second request must be met.

In FIG. 3, the first access completes during time=12, and the rest of time=12 is used waiting for DRAM 45 to turn off and then the next CAS# access starts. The second access completes during time=17 with data being captured in data path 150. This results in 5 clocks as the minimum time from one access to the next and sets the minimum latency and the maximum bandwidth for the system shown in FIG. 2 without data strobe 55. In one embodiment of the present invention, 32 bytes are read with each memory access and the clock period is 10 nanoseconds (ns). Five clock periods is 50 ns.

Therefore the maximum sustained bandwidth is 32/50 ns=640 megabytes (MB) per second using the memory subsystem of FIG. 2 without data strobe 55.

The following timing equations apply to the memory subsystem of FIG. 2 without data strobe 55.

$$tCAC = tCOCAS + tFLIGHTCAS + tDEVICECAC + tDATAFLIGHT + tDSU. \quad (1)$$

Where tCAC is the CAS access time (tCAC 300 in FIG. 3), or the time it takes to access data from the falling edge of CAS (Max) and:

tCOCAS=Time from positive clock edge through the flip-flop and buffer of the memory controller;

tFLIGHTCAS=Time that the CAS signal takes to propagate to the DRAM devices (e.g., DRAMs 45 and 46). With a large amount of board routing, capacitance and connectors, this can become significant (e.g., 5–10 ns);

tDEVICECAC=Time it takes for the DRAM devices to access data from a CAS# assertion;

tDATAFLIGHT=Time that the data signals take to propagate to the data path device (e.g., data path 150). With a large amount of board routing, capacitance and connectors, this can become significant (e.g., 5–10 ns);

tDSU=Time required by the data path that data must arrive before a positive clock edge so that it is clocked in the device validly. Logic and buffers in the input stage of the data path can make this significant.

tCAC sets the minimum amount of time that the DRAMs can be accessed in the memory subsystem, rounded up to the next positive clock edge. So if tCAC is 35 ns then, for a system with a 10 ns clock period, the minimum access time would be four clocks.

$$tON = tCOCAS + tFLIGHTCAS + tDEVICEON, \quad (2)$$

where tDEVICEON is the time it takes for the DRAM device itself to detect CAS asserted and start outputting data. tON is the time from CAS assertion to the DRAMs driving data (min).

$$tOFF = tCOCAS + tFLIGHTCAS + tDEVICEOFF, \quad (3)$$

where tDEVICEOFF is the time it takes for the DRAM device to stop driving data. tOff is the time from RAS de-assertion to the DRAMS changing to high impedance (max).

tON and tOFF work in conjunction when accessing multiple rows or sets of DRAM devices coupled to the same data bus. If the minimum value of tON is greater than the maximum value of tOFF, then the access from one device to the next can occur simultaneously. Typically, this is never the case. tON is normally near zero and tOFF is usually a large positive number somewhere around 10 ns. This means that the memory controller must wait nearly a full tOFF time before starting the access to the next row of DRAMS. This increases the latency as previously described. This wait time occurs during time=12 in FIG. 3.

Figure 4:
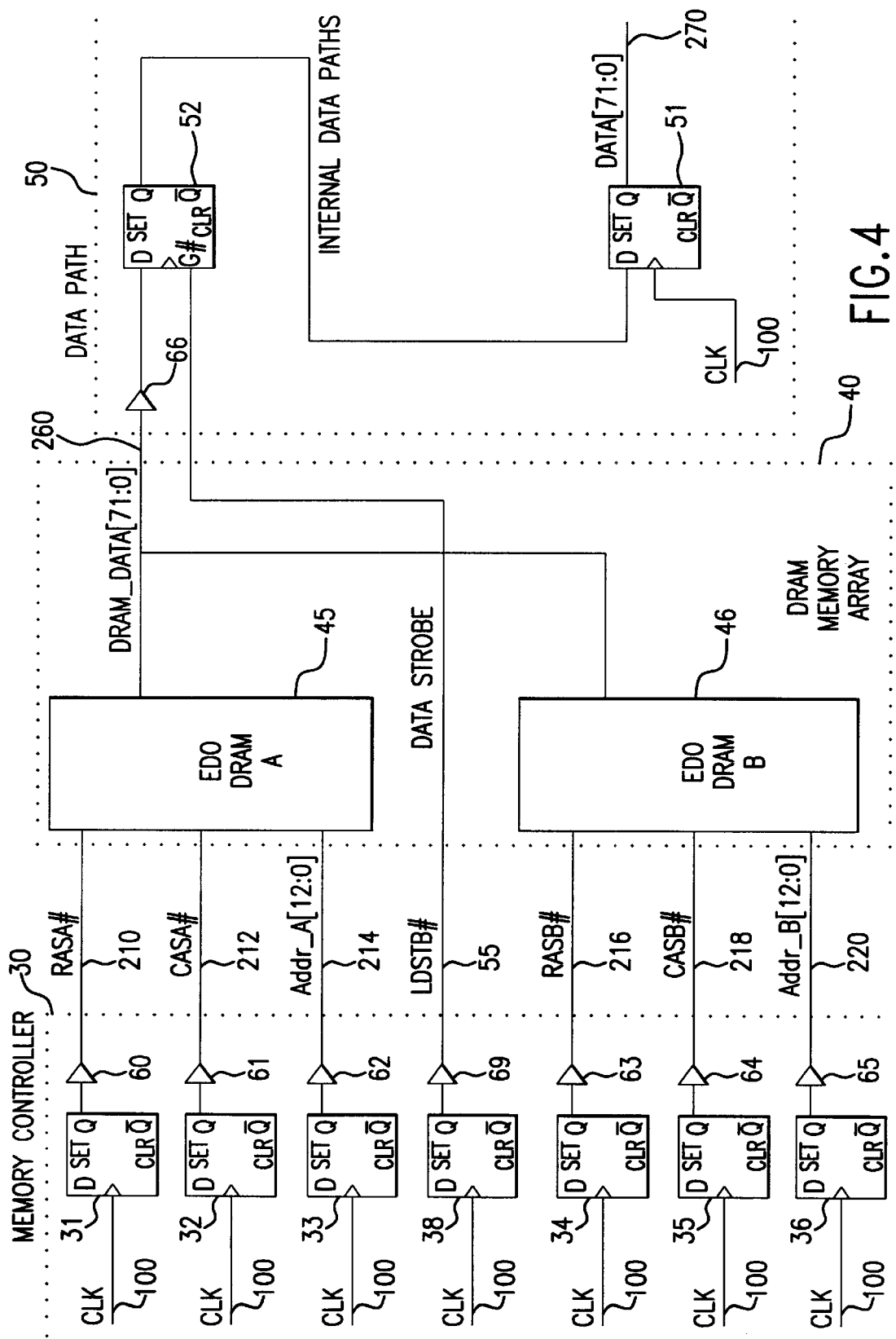
FIG. 4 is a block diagram illustrating in more detail a memory controller including a data strobe generator, DRAM memory array and a data path having a latch and a flip-flop, of the memory subsystem of the computer system of FIG. 1 in accordance with one embodiment of the present invention.

FIG. 4 is a block diagram illustrating in more detail memory controller 30, DRAM memory array 40 and data path 50 of the memory subsystem of FIG. 1 in accordance with one embodiment of the present invention. Memory controller 30 is structurally similar to memory controller 130. However, memory controller 30 includes a flip-flop 38 coupled to a buffer 69 that generates data strobe 55 (also referred to as "LDSTB#" in FIGS. 4 and 5). Flip-flop 38 is also coupled to CLK 100. DRAM memory array 40 is structurally similar to DRAM memory array 140 of FIG. 2.

Data path 50 includes a latch 52. DRAM_Data bus 260, which is the output data bus from DRAM memory array 40, is coupled to buffer 66 and the input of latch 52. Data strobe 55 is coupled to a gate of latch 52. The output of latch 52 is coupled to the input of flip-flop 51. Flip-flop 51 is further coupled to CLK 100 and outputs data on bus 270 to the requesting device.

As shown in FIG. 4, data strobe 55 is generated by the same clock (CLK 100) as CASA# 212 and CASB# 218. By providing an asynchronous signal that is synchronous with the main data access control signals, CAS# 212 and CAS# 218, the data can be captured at data path 50 before the next rising edge of the common clock. This allows the first access at DRAM 45 to be terminated one clock earlier and the next access at DRAM 46 to start one clock earlier than without data strobe 55.

Figure 5:
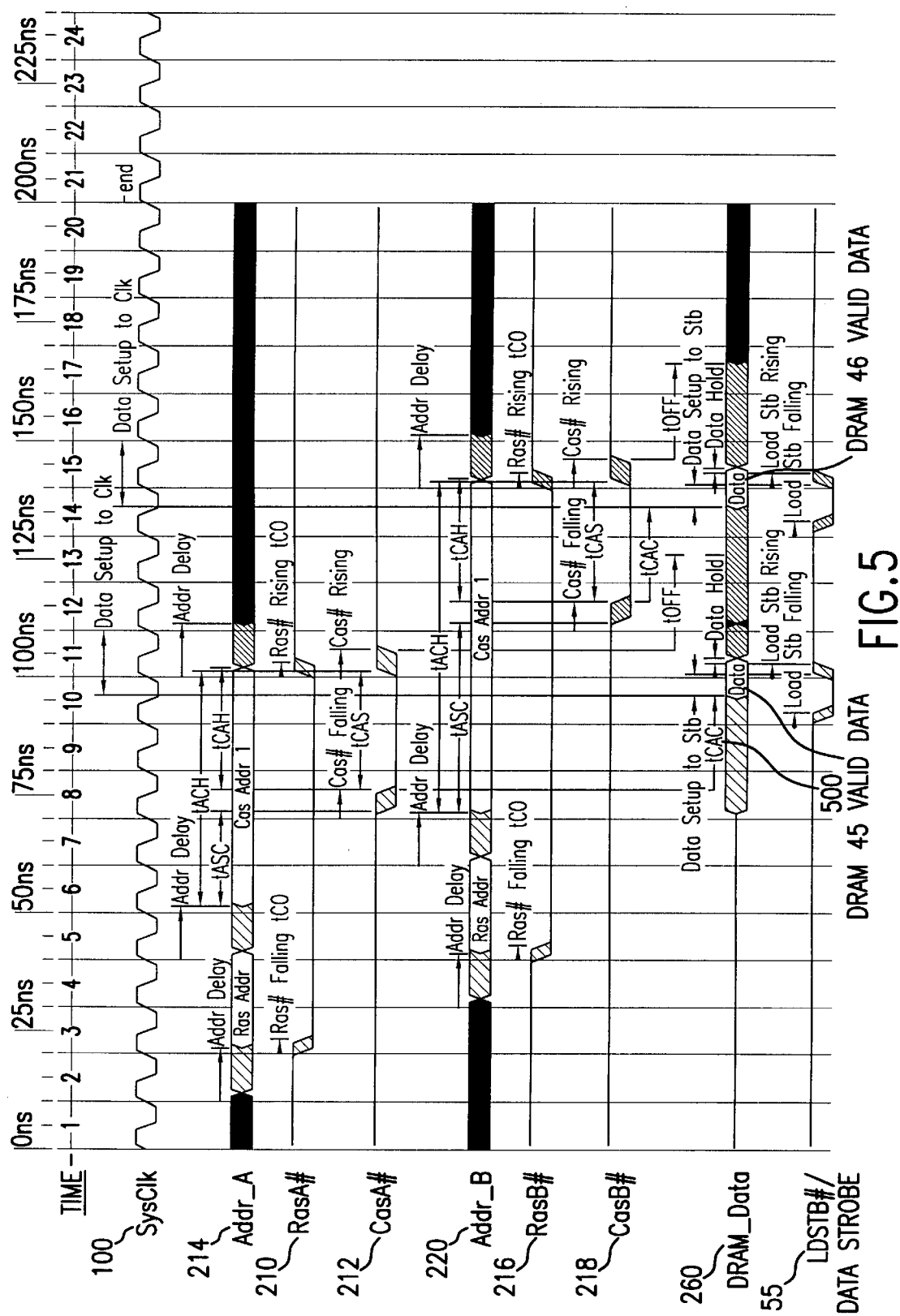
FIG. 5 is a timing diagram of DRAM access to the DRAM memory array of the memory subsystem of FIG. 4.

FIG. 5 is a timing diagram of DRAM access to DRAM memory array 40 of FIG. 4. As in FIG. 3, access starts with a row address being applied to Addr_A 214 and RASA# 210 being asserted during time=3. Next, Addr_A 214 changes to the column address during time=6 and CASA# 212 is asserted during time=8.

During time=10, data strobe 55 is asserted. This causes data on DRAM_Data bus 260 to flow through latch 52. RASA# 210, CASA# 212 and data strobe 55 can then be de-asserted during time=11 because the de-assertion of data strobe 55 will cause the data flowing through latch 52 to be captured. The de-assertion of RASA# 210 will cause DRAM 45 to stop outputting data. The wait time during time=12 of FIG. 3 can then be eliminated and the next CAS# assertion (CASB# 218) can take place at time=12. This reduces the row to row access time from 5 clocks in FIG. 3 without data strobe 55 to 4 clocks with data strobe 55. The bandwidth increases from 640 MB/s to 800 MB/s with data strobe 55, which is a 25% increase.

The assertion of data strobe 55 is predictive with respect to the arrival of valid data. Since the assertion only opens the gate of latch 52, this is acceptable. The de-assertion of data strobe 55 during time=11 is the edge that actually finalizes the captured data in between positive edges of the clock. After the data is captured, the setup time to flip-flop 51 that captures data internal to data path 50 must still be met. This is easily implemented in a monolithic semiconductor device.

The following timing equations apply to the memory subsystem of FIG. 4 with data strobe 55.

$$tCAC=tCOCAS+tFLIGHTCAS-tCOLDSTB-tFLIGHTDSTB+tDEVICECAC+tDATAFLIGHT+tDSU. \quad (5)$$

Where:

tCOLDSTB=Time from positive clock edge until data strobe 55 appears at the device pins. Since data strobe 55 and CAS# are generated from the same device, using identical circuits, the tCO (i.e., the time delay due to the built-in capacitance of the traces) for each will be nearly identical in value;

tFLIGHTDSTB=Time that data strobe 55 takes to propagate to data path 50. With a large amount of board routing, capacitance and connectors this can be significant but is almost always less than tFLIGHTCAS due to less routing and load.

In equation (5), tDSU changes slightly in value in comparison to the previous tDSU in equation 1 because it is now the time for data to setup to latch 52 with respect to data strobe 55.

As compared to tCAC 300 for the memory subsystem without data strobe 55, both tCOLDSTB and tFLIGHTDSTB are subtracted from the tCAC 500 with data strobe 55 because they are generated from the same device using the same clock and because it becomes the effective clock at data path 50. Therefore, the use of data strobe 55 decreases the value of tCAC 500 compared to tCAC 300 of FIG. 3. Data strobe 55 should be used as the gate for latch 52, not a clock for flip-flop 51.

As described, in the present invention, data strobe 55 from memory controller 30 to data path 50 decreases the wait time between an access of DRAM 45 followed by an access of DRAM 46 because the CAS for the first access can be de-asserted earlier. This results in a decreased access time to DRAM memory array 40 regardless of the length of the traces from memory controller 30 to DRAM memory array 40.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of accessing a dynamic random access memory (DRAM) array comprising a first DRAM set, a second DRAM set, and a DRAM array output, said method comprising:

(a) asserting a first column address strobe (CAS) which is applied to said first DRAM set;

(b) providing a first data signal from the first DRAM set;

(c) asserting a data strobe which is applied to a data path coupled to said DRAM array output;

(d) opening a latch within said data path to cause the first data signal on said DRAM array output to flow into the data path in response to the assertion of said data strobe;

(e) de-asserting said data strobe and said first CAS, wherein de-asserting the data strobe causes the data flowing through the data path to be captured; and (f) asserting a second CAS which is applied to said second DRAM set, wherein said second CAS is asserted while said first data signal is being provided by the first DRAM set.

2. The method of claim 1, further comprising:
(f) asserting for a second time the data strobe applied to the data path; and
(g) latching second data on said DRAM array output at the data path.

3. The method of claim 1, wherein said data path further comprises a flip-flop, and wherein said method further comprises:
clocking said first data through the flip-flop on a next clock cycle after said data strobe is asserted.

4. The method of claim 1, wherein said first data signal on said DRAM array output at said data path is valid while said data strobe is asserted.

5. The method of claim 4, wherein said first CAS is de-asserted on a next clock cycle after said data strobe is asserted.

6. The method of claim 1, further comprising:
asserting a first row address strobe (RAS) which is applied to said first DRAM set;
de-asserting the first RAS; and
asserting a second RAS which is applied to said second DRAM set, wherein said second RAS is asserted while said first data signal is being provided by the first DRAM set.

7. The method of claim 6, wherein the first CAS is de-asserted while the first RAS is de-asserted.

8. A memory subsystem for a computer system, the memory subsystem comprising:
a dynamic random access memory (DRAM) array comprising:
a first dram set to provide a first data signal in response to an assertion of a first column address strobe (CAS) applied thereto;
a second DRAM set; and
a DRAM array output;
a datapath coupled to the DRAM array output, said data path comprising a latch which is opened to cause the first data signal to flow into the data path in response to assertion of a data strobe applied thereto and to cause data flowing into the data path to be captured in response to de-assertion of the data strobe; and
a memory controller coupled to the DRAM array and the datapath, the memory controller comprising:
a first output coupled to provide the first column address strobe;
a second output coupled to provide the data strobe; and
a third output coupled to provide a second CAS which is applied to the second DRAM set, said memory controller asserting the second CAS while the first data signal is being provided by the first DRAM set.

9. The memory subsystem of claim 8, wherein said data path further comprises a flip-flop and wherein said first data signal is clocked through said flip-flop on a next clock cycle after said data strobe is asserted.

10. The memory subsystem of claim 8, wherein the first data signal is valid while said data strobe is asserted.

11. The memory subsystem of claim 10, wherein the first CAS is de-asserted on a next clock cycle after said data strobe is asserted.

12. The memory subsystem of claim 8, wherein:
a row address strobe (RAS) which is applied to the second DRAM set is asserted while said first data signal is being provided by the first FRAM set.

13. The memory subsystem of claim 12, wherein the first CAS is de-asserted while a row address strobe (RAS) which is applied to the first DRAM set is de-asserted.

14. An apparatus for accessing a dynamic random access memory (DRAM) array comprising a first DRAM set, a second DRAM set, and a DRAm array output, said apparatus comprising:
(a) a means for asserting a first column address strobe (CAS) which is applied to said first DRAM set;
(b) a means for providing a first data signal from the first DRAM set;
(c) a means for asserting a data strobe which is applied to a data path coupled to said DRAM array output;
(d) a means for causing the first data signal on said DRAM array output to flow into the data path in response to assertion of said data strobe;
(e) a means for de-asserting the data strobe and the first CAS, wherein de-asserting the data strobe causes the data flowing through the data path to be captured; and
(f) a means for asserting a second CAS which is applied to said second DRAM set, wherein said second CAS is asserted while said first data signal is being provided by the first DRAM set.

15. The apparatus of claim 14, wherein said first data signal on said DRAM array output at said data path is valid while said data strobe is asserted.

16. The apparatus of claim 14, wherein said data path further comprises a flip-flop, and wherein said apparatus further comprises:
a means for clocking said first data through the flip-flop on a next clock cycle after said data strobe is asserted.

17. The apparatus of claim 14, further comprising:
(f) a means for capturing second data on said DRAM array output at the data path after asserting the data strobe applied to the data path for a second time.

18. The apparatus of claim 17, wherein said first CAS is de-asserted on a next clock cycle after said data strobe is asserted.

19. The apparatus of claim 14, further comprising:
a means for asserting a first row address strobe (RAS) which is applied to said first DRAM set;
a means for de-asserting a second RAS which is applied to said second DRAM set, wherein said second RAS is asserted while said first data signal is being provided by the first DRAM set.

20. The apparatus of claim 19, wherein the first CAS is de-asserted while the first RAS is de-asserted.

21. A memory subsystem for a computer system, the memory subsystem comprising:
a dynamic random access memory (DRAM) array comprising:
a first DRAM set to provide a first data signal in response to an assertion of a first column address strobe (CAS) applied thereto;
a second DRAM set; and
a DRAM array output;
a datapath coupled to the DRAM array output, said data path comprising a means for causing the first data signal to flow into the data path in response to an assertion of a data strobe applied thereto and to cause data flowing into the path to be captured in response to de-assertion of the data strobe; and
a memory controller coupled to the DRAM array and the datapath, the memory controller comprising:
a first output coupled to provide the first column address strobe;
a second output coupled to provide the data strobe; and
a third output coupled to provide a second CAS which is applied to the second DRAM set, said memory controller asserting the second CAS while the first data signal is being provided by the first DRAM set.

22. The memory subsystem of claim 21, wherein said data path further comprises a flip-flop and wherein said first data signal is clocked through said flip-flop on a next clock cycle after said data strobe is asserted.

23. The memory subsystem of claim 21, wherein the first data signal is valid while said data strobe is being asserted.

24. The memory subsystem of claim 23, wherein the first CAS is de-asserted on a next clock cycle after said data strobe is asserted.

25. The memory subsystem of claim 21, wherein:

a row address strobe (RAS) which is applied to the second DRAM set is asserted while said first data signal is being provided by the first DRAM set.

26. The memory subsystem of claim 25, wherein the first CAS is de-asserted while a row address strobe (RAS) which is applied to the first DRAM set is de-asserted.

* * * * *

UNITED STATES PATENT AND TRADEMARK OFFICE
CERTIFICATE OF CORRECTION

PATENT NO. : 6,557,071 B2
DATED : April 29, 2003
INVENTOR(S) : Stolt et al.

It is certified that error appears in the above-identified patent and that said Letters Patent is hereby corrected as shown below:

<u>Column 7,</u>
Line 31, change "dram" to -- DRAM --
Line 64, change "FRAM" to -- DRAM --

<u>Column 8,</u>
Line 3, change "DRAm" to -- DRAM --
Line 40, insert -- a means for de-asserting the first RAS; and --.

Signed and Sealed this

Third Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,557,071 B2
DATED : April 29, 2003
INVENTOR(S) : Stolt et al.

It is certified that error appears in the above-identified patent and that said Letters Patent is hereby corrected as shown below:

<u>Title page, Item [54] and Column 1, lines 1-5,</u>
Delete the title and insert -- MEMORY SYSTEM INCLUDING A MEMORY CONTROLLER HAVING A DATA STROBE GENERATOR AND METHOD FOR ACCESSING FIRST AND SECOND MEMORY SETS USING A DATA STROBE --

Signed and Sealed this

Twenty-third Day of November, 2004

JON W. DUDAS
*Director of the United States Patent and Trademark Office*